No. 644,529. Patented Feb. 27, 1900.
J. MECREDY.
EVAPORATING APPARATUS.
(Application filed Aug. 14, 1899.)
(No Model.)
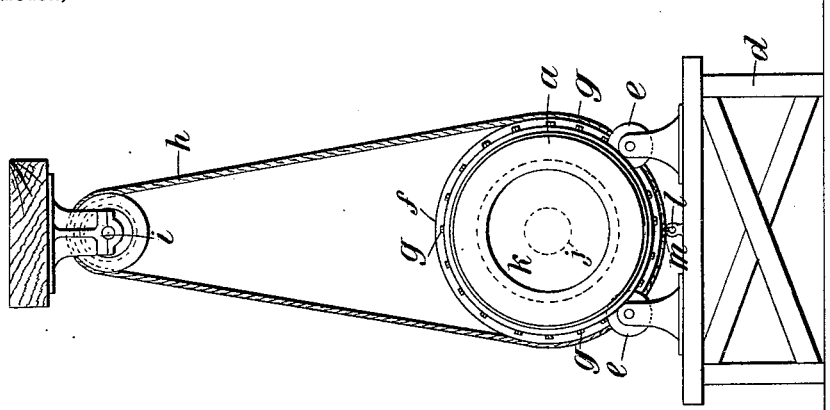
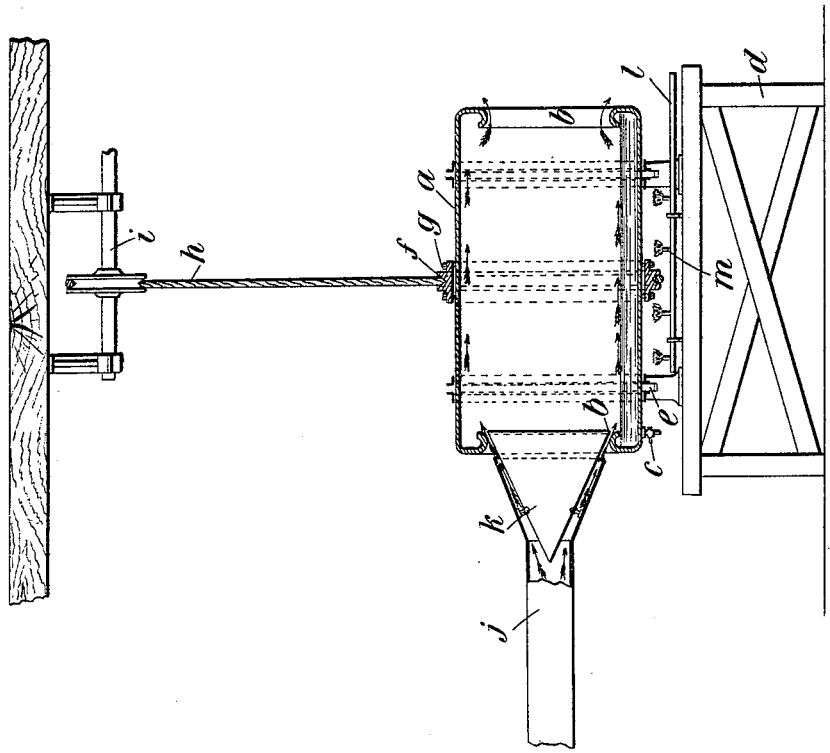
Witnesses
H. B. Keefer
Geo. E. Sullivan
Inventor
James Mecredy
by James L. Norris
atty

UNITED STATES PATENT OFFICE.

JAMES MECREDY, OF LONDON, ENGLAND.

EVAPORATING APPARATUS.

SPECIFICATION forming part of Letters Patent No. 644,529, dated February 27, 1900.

Application filed August 14, 1899. Serial No. 727,199. (No model.)

*To all whom it may concern:*

Be it known that I, JAMES MECREDY, barrister-at-law, a subject of the Queen of Great Britain, residing at Brick Court, Temple, London, England, have invented certain new and useful Improvements in Apparatus for Concentrating or Drying Liquid or Semiliquid Substances by Evaporation, of which the following is a specification.

This invention relates to apparatus for concentrating or drying liquid or semiliquid substances by the partial or entire evaporation of their water or more volatile constituents, and has for its object to effect such evaporation rapidly and in such manner as to permit any degree of concentration to be obtained and to cause said evaporation to proceed evenly throughout the mass of the substance treated, so that a perfectly-homogeneous product is obtained.

According to my invention I employ a rotatable cylinder which keeps the substance agitated during evaporation and exposes a film of the said substance to a current of air passing over the periphery of the said cylinder. The air is preferably warmed, and I also provide means whereby the cylinder may be heated if required.

In order that my invention may be clearly understood and readily carried into effect, I will proceed to describe the same fully with reference to the accompanying drawings, in which—

Figure 1 is a part-sectional side elevation, and Fig. 2 is an end view, of my apparatus.

$a$ is a hollow rotary cylinder of metal, having inwardly-curved flanges $b\ b$ at its ends and a draw-off cock $c$. The inner periphery of this cylinder is preferably enameled.

$d$ is a framework of any suitable construction, upon which the cylinder $a$ is supported by means of roller-bearings $e\ e$.

$f$ is a band or pulley, secured to the outside of the cylinder by means of set-screws $g\ g$.

$h$ is an endless band passing around the pulley $f$ and also around a pulley on a rotary shaft $i$, which shaft is actuated from any suitable source of power.

$j$ is a pipe through which a current of air, preferably heated, is conducted from any suitable source into one end of the cylinder $a$. The mouth of the pipe $j$ is funnel-shaped and has a cone $k$ situated within it. The base of this cone $k$ is of somewhat less diameter than the diameter of the openings at the ends of the cylinder, and said base extends a short distance into one end of the cylinder. The current of air passes between the funnel-shaped mouth of the pipe $j$ and the cone $k$. The cone $k$ serves to distribute or spread the current of air, so as to cause the said air to impinge upon the inner periphery of the cylinder $a$.

$l$ is a gas-supply pipe situated beneath the cylinder $a$ and fitted with burners $m$, whereby the said cylinder may be heated if required.

The substance to be evaporated is poured into the cylinder $a$ through the open end thereof which is opposite to the air-pipe $j$. The cylinder $a$ is then caused to rotate by means of the belt $h$ and rotary shaft $i$, and a current of air is passed through it by means of the pipe $j$ and cone $k$. As the cylinder rotates a thin film of the substance under treatment adheres to the upwardly-moving side of and is carried around with said cylinder. At the same time the body of the substance is agitated and the settlement or separation of the heavier from the lighter particles thereof is prevented without the aid of stirrers. The inwardly-curved flanges $b\ b$ prevent the escape of any of the substance from the ends of the cylinder. When the substance is concentrated or evaporated to the required degree, the operation is stopped, and the finished product may then be drawn off by means of the cock $c$. A large surface of the substance in the form of a thin film is thus subjected to the drying action, which latter is consequently very rapid.

Owing to its open construction the cylinder is very easily cleaned.

What I claim is—

1. In evaporating apparatus, the combination of a hollow rotary cylinder having open ends each constructed with an annular, inwardly-curved flange to retain the material to be treated therein, an air-supply pipe having a mouth arranged to deliver air into one of the annularly-curved flanged open ends of said cylinder, a device arranged in the mouth of said pipe for directing the air toward the inner surface of the cylinder, means for rotating the cylinder, and means for heating said cylinder, substantially as and for the purposes described.

2. In evaporating apparatus, the combination of a hollow rotary cylinder having open ends, each constructed with an annular, inwardly-curved flange to retain the material to be treated therein, an air-supply pipe having a funnel-shaped mouth arranged to deliver air into one of the annularly-curved flanged openings of said cylinder, a device arranged in the funnel-shaped mouth of said pipe for directing the air into the cylinder toward the inner surface thereof, means for rotating said cylinder, and means for heating said cylinder, substantially as and for the purposes described.

3. In evaporating apparatus, the combination of a hollow rotary cylinder having open ends provided with means for retaining the material to be treated in said cylinder, means for rotating said cylinder, an air-supply pipe having a funnel-shaped mouth, an air-distributing cone located in the funnel-shaped mouth of said pipe and having its base extended into one end of said rotary cylinder, and means for heating the cylinder, substantially as and for the purposes described.

4. In evaporating apparatus, the combination of a hollow rotary cylinder to receive the material to be treated, means for rotating said cylinder, an air-supply pipe having a funnel-shaped mouth, an air-distributing cone located in the funnel-shaped mouth of said pipe and having its base extended into one end of the said rotary cylinder, gas-burners for externally heating said cylinder, and a draw-off cock for removing the contents of the cylinder, substantially as described.

In testimony whereof I have hereunto set my hand, in presence of two subscribing witnesses, this 20th day of July, 1899.

JAMES MECREDY.

Witnesses:
  J. COLLINS,
  FRED. C. HARRIS.